(12) United States Patent
Vepsäläinen

(10) Patent No.: US 6,427,354 B1
(45) Date of Patent: Aug. 6, 2002

(54) METHOD AND APPARATUS FOR MEASURING DIMENSIONAL ROUGH STONE BLOCKS

(75) Inventor: Jari Vepsäläinen, Taavetti (FI)

(73) Assignee: Sandvik Tamrock OY, Tampere (FI)

( * ) Notice: Subject to any disclaimer, the term of this patent is extended or adjusted under 35 U.S.C. 154(b) by 0 days.

(21) Appl. No.: 09/314,022

(22) Filed: May 19, 1999

(51) Int. Cl.⁷ .................................................. G01B 5/20
(52) U.S. Cl. ............................. 33/554; 33/1 V; 33/121; 33/504; 702/155
(58) Field of Search ............................ 33/554, 553, 503, 33/1 V, 1 H, 1 M, 121, 124, 122, 123, 504, 505, 551, 559, 556; 702/33, 36, 55, 94, 95, 150–153, 157, 166, 169, 155, 158, 167, 168, 170

(56) References Cited

U.S. PATENT DOCUMENTS

| | | | | |
|---|---|---|---|---|
| 4,573,131 A | * | 2/1986 | Corbin | 702/168 |
| 4,797,822 A | * | 1/1989 | Peters | 702/11 |
| 5,402,582 A | * | 4/1995 | Raab | 33/503 |
| 5,440,492 A | * | 8/1995 | Kozah et al. | 702/153 |
| 5,477,622 A | * | 12/1995 | Skalnik | 33/1 V |
| 5,834,623 A | * | 11/1998 | Ignagni | 702/105 |
| 5,909,013 A | * | 6/1999 | Dlugos | 33/1 V |
| 5,956,660 A | * | 9/1999 | Neumann | 702/150 |

FOREIGN PATENT DOCUMENTS

JP 1-141307 * 6/1989 .................. 33/1 V

* cited by examiner

Primary Examiner—Diego Gutierrez
Assistant Examiner—Madeline Gonzalez
(74) Attorney, Agent, or Firm—Nixon & Vanderhye P.C.

(57) ABSTRACT

A method and an apparatus for measuring dimensional rough stone blocks. In the method, a dimensional rough stone block is measured in a three-dimensional coordinate system by means of an inertia measuring device by moving the device from one point to another on the surface of the stone block to be measured. The apparatus comprises an inertia measuring device and a calculating device with which it is possible to calculate the dimensions of the stone block based on the coordinate values of the points measured by the inertia measuring device.

3 Claims, 1 Drawing Sheet

METHOD AND APPARATUS FOR MEASURING DIMENSIONAL ROUGH STONE BLOCKS

The invention relates to a method of measuring dimensional rough stone blocks, in which method the outer dimensions of a dimensional rough stone block are measured and the amount of useful material in the block is determined on the basis of the conducted measurements.

The invention further relates to an apparatus for measuring a dimensional rough stone block.

BACKGROUND AND SUMMARY OF THE INVENTION

Dimensional rough stone blocks are quarried from rock in order to process the blocks into rock material that is suitable for different purposes. At present, such rock material is used increasingly for different surface or coating materials for which purpose the rock is sawn into rather thin sheets. When a large block of a suitable size has been cut off, it is sawed into smaller pieces as required in each case. In order for the sawing of a rough stone block to be as cost-effective as possible, the shape of the block must be measured, whereafter a plan is devised for the use of the block based on the measurement result. Another purpose of the measurement is that when the haulage of the blocks from the quarry to the place where they are to be processed is being planned, the weight of the blocks must also be known.

A rough stone block is measured in three main directions where gross length, gross height and gross width are determined. These are used to calculate the gross volume of the block and its weight on the basis of the density properties of the rock material in question. When the weight is calculated, it is naturally also necessary to take into account possible deviations of the block from a basic rectangular shape. Useful rock volume of a rough stone block is obtained, in principle, by in a way placing an imaginary rectangular prism about the block to establish maximum outer dimensions of the block, and by subtracting a working allowance of 5 to 10 cm from the obtained principal dimensions. The results of the measurement are stored specifically for each rough block, so that the basic data for the sale and processing of the block already exist.

The aforementioned measurements carried out conventionally by means of a measuring tape and visual evaluation of the dimensions are useful as such, but in the worst case they take a lot of time especially when the shape of the block differs substantially from rectangular. Also, determining the useful rock volume in this manner causes errors which become apparent in the lower degree of usability of the block than presumed and in too great haulage weights, among other things.

The purpose of the present invention is to provide a method and an apparatus which provide as efficient and reliable measurement of a dimensional rough stone block as possible, and more reliable and accurate measurement and evaluation of the block than previously.

The method according to the invention is characterized by the measurement of the stone block being carried out in a three-dimensional coordinate system by means of an inertia measuring device such that the device is placed at suitable measuring points on the surface of the block, and the dimensions and shape of the block being calculated on the basis of the values of the measuring points determined by the inertia measuring device in the three-dimensional coordinate system.

The apparatus according to the invention is characterized in that it comprises an inertia measuring device which measures the location of a certain point on the surface of the rough stone block to be measured in the three-dimensional coordinate system, and a calculating device to which the values of the points of the block measured with the inertia measuring device in said three-dimensional coordinate system can be transferred and with which the dimensions and shape of the measured block in the three-dimensional coordinate system can be calculated on the basis of said measured points.

The basic idea of the invention is that the dimensions of a block are measured by utilizing inertia location, wherein an inertia measuring device is first placed in one suitable measuring point and then moved therefrom to several other measuring points in a suitable order and finally placed most preferably again in the first measuring point to take into account errors that have possibly occurred during the measurement. An inertia measuring device, which at the moment of measurement is in contact with the rough stone block to be measured, enables measurement of the location of the measuring points in the surrounding three-dimensional coordinate system and storing of the results in a memory of a calculating device, such as a computer, which is thereafter able to calculate, on the basis of the measured points of the surface, the shape of the block and, for example, the useful amount and weight of the rock material obtained from the block.

BRIEF DESCRIPTION OF THE DRAWINGS

The invention will be described in greater detail in the accompanying drawings.

DETAILED DESCRIPTION OF THE INVENTION

Figure 1:
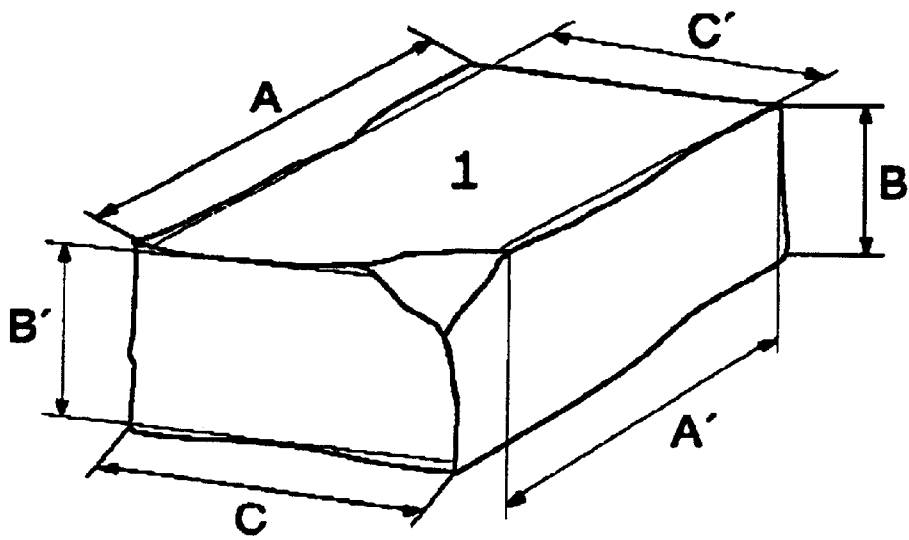
FIG. 1 shows schematically the principles of prior art measurement of a dimensional rough stone block.

FIG. 1 shows schematically how a dimensional rough stone block is measured according to a prior art method. The figure shows, in a perspective view, a dimensional rough stone block 1. The figure also shows the outermost dimensions of the block: horizontal length, width and height. Further, thin lines A, A' B, B' and C C' denote in the figure the available net length, net width and net height of the rough stone block 1 determined specifically for each side, and the useful net volume of the block can be calculated from the aforementioned dimensions.

Figure 2:
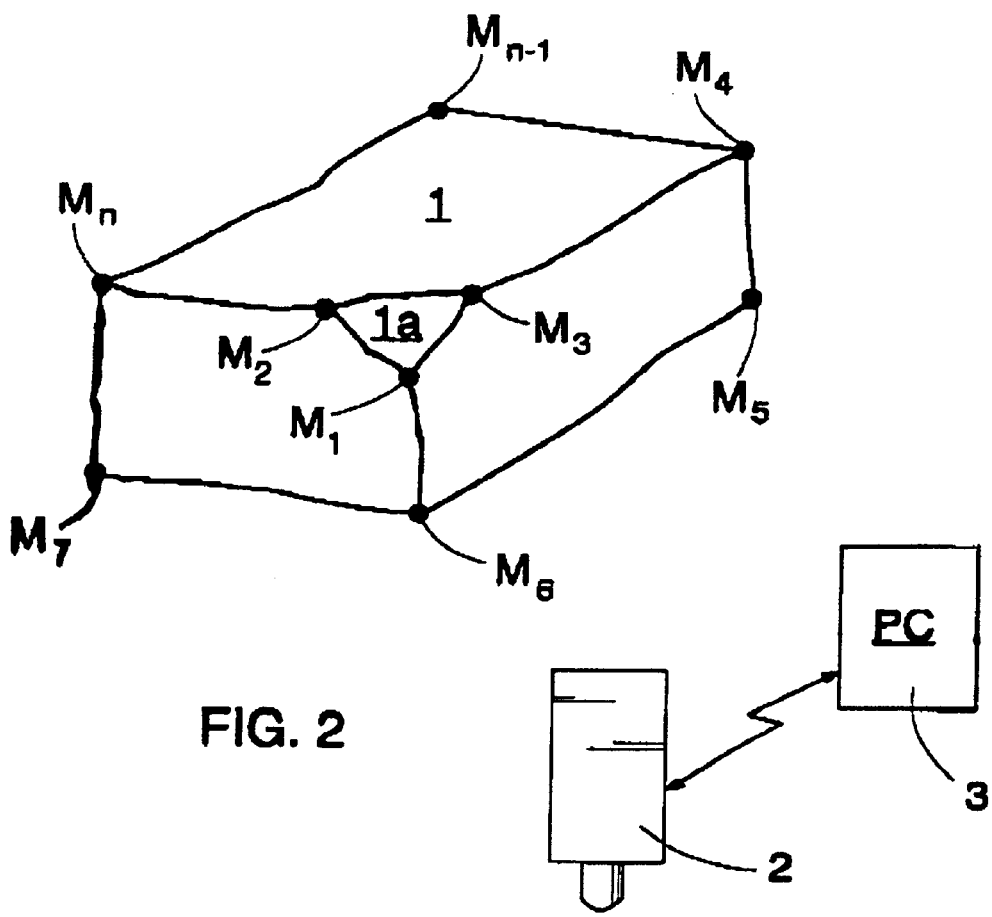
FIG. 2 shows schematically the measurement of a dimensional rough stone block with an inertia measuring device.

FIG. 2 shows schematically how the same block can be determined in a three-dimensional manner in a computer memory by means of inertia measurement. The figure shows an inertia measuring device 2, which is placed at the beginning of the measurement for example at measuring point M1 and moved therefrom to measuring point M2 and from there via other measuring points all the way to measuring point Mn, whereafter it is possibly returned back to measuring point M1. The figure shows the measurement of only the three sides of the block that are visible in the figure, but measurement is carried out in a similar manner also on the sides that are not shown therein, at least from the outermost corners of the block and from a sufficient number of points if there are any exceptionally shaped parts on the sides.

As shown in the figure, the rough stone block 1 comprises in a visible corner a cleavage surface 1a, which has approximately a triangular shape. In this case, the triangle is determined by measuring one measuring point from each corner thereof, so that the shape of the triangle and its effect on the useful amount of the stone block can be taken into account. Correspondingly, the shape and the effect of other deviating parts on the entire block can be taken into account by means of similar measurement.

The positions of the measuring points measured in this manner in the surrounding three-dimensional coordinate system, in other words with respect to the earth, can be processed in a computer 3 shown in the figure, which is able to calculate rather accurately, on the basis of the location coordinates of the measuring points, the shape of the dimensional rough stone block 1 and to determine thereafter, also in the three-dimensional coordinate system, the net volume of the useful part of the block, the weight of the entire block and the weight of the useful net volume, among other things. The obtained model of the store block and the plane for the exploitation of the block can be utilized both in the planning of the haulage and in the sale of the block, and correspondingly in production control when planning the manufacture of the block.

Inertia measurement can be carried out in several different manners. The inertia measuring device may be a separate device which stores the measuring points in a memory so that they can be transferred later to a calculation unit, such as a PC or the like. Correspondingly, the inertia measuring device may comprise a calculation unit as such, or it may be connected to a separate calculation unit by a cable, a wireless data transmission apparatus or the like.

The inertia measuring device is known per se. When the device is used in the three-dimensional coordinate system, it is based on three gyroscopic discs placed perpendicularly with respect to one another and rotating around an axis. The discs are used to accurately measure the acceleration and speed of motion of the measuring device in different directions. In order to minimize errors occurring as a function of time, the measurement should be as fast as possible. If the measurement takes a longer time, the resulting errors of measurement can be compensated for by returning the inertia measuring device to the first measuring point at the end of the measurement so that the differences between the first and the last measurement can be used to correct the errors with respect to the other measuring points, thus enabling very accurate measurement. In addition to the gyroscopic discs, the device comprises acceleration sensors measuring linear movement and providing signals on the basis of which it is possible to calculate location coordinates starting from a certain point. In addition to mechanical gyroscopic discs, there are also optical gyroscopes which do not comprise mechanically moving and wearing parts. Such inertia measuring devices are commercially widely available and their operation and use are generally known, wherefore they will not be described in greater detail herein.

Measurement can be carried out in different manners; for example, the actual measurement can be performed first and the data can be stored in the memory of the inertia measuring device, from which it can be unpacked later by a computer, whereupon calculation can be carried out on the basis thereof. Another alternative is to use the inertia measuring device so that it is connected directly to the computer, whereupon the location coordinates of each point can be stored directly in the computer and the calculation can be carried out continuously already during the measurement. In practice, the implementation of the measurement is not essential to the basic principle of the invention.

What is claimed is:

1. A method of determining dimensions and shape of a rough stone block comprising (a) measuring outer dimensions of a rough stone block; (b) determining on the basis of measurements made in step (a) the amount of useful material in said rough stone block, wherein the measurement of said rough stone block is carried out in a three-dimensional coordinate system by means of an inertia measuring device, such that the inertia measuring device is placed at suitable measuring points on surfaces of said rough stone block; and wherein the dimensions and shape of said block are calculated on the basis of values of said measuring points in the three-dimensional coordinate system.

2. A method according to claim 1, wherein the amount of the useful material in said rough stone block is determined on the basis of the calculated shape.

3. A method according to claim 1, wherein during measurement by said inertia measuring device, after a last measuring point has been measured, said inertia measuring device is returned to a first measuring point in order to determine errors that occurred during step (a).

* * * * *